Patented Nov. 4, 1947

2,430,004

UNITED STATES PATENT OFFICE 2,430,004

CERTAIN DICARBOXY ACID ESTERS OF OXYALKYLATED POLYMERIZED HYDROXYAMINES

Melvin De Groote, University City, and Bernhard Keiser, Webster Groves, Mo., assignors to Petrolite Corporation, Ltd., Wilmington, Del., a corporation of Delaware No Drawing. Original application April 2, 1945, Serial No. 586,264. Divided and this application November 26, 1945, Serial No. 630,971

8 Claims. (Cl. 260—404.5)

This invention relates to a new chemical compound or product, our present application being a division of our pending application Serial No. 586,264, filed April 2, 1945.

The object of our invention is to provide a new material or composition of matter, that is particularly adapted for use as a demulsifier in the resolution of crude oil emulsions, but which is also capable of use for various other purposes, or in various other arts.

The new material or composition of matter herein described, consists of an ester derived by esterification reaction between (a) An oxyalkylated heat-polymerized triethanolamine, or the like; and (b) Certain dicarboxy acids hereinafter described.

It is well known that aminoalcohols, particularly tertiary aminoalcohols, react with high molal acids, such as higher fatty acids or their equivalents, to yield esters having basic properties provided that there is no negative group such as an acyl radical or aryl radical directly attached to the amino nitrogen atom. For instance, the reaction involving diethyl ethanolamine and stearic acid may be shown in the following manner:

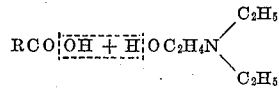

If, however, triethanolamine is substituted for diethylethanolamine, the same comparable reaction is illustrated in the following manner:

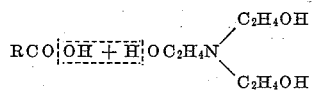

The reaction is generally conducted at fairly high temperatures, for instance, temperatures sufficient to drive off water yet below the point of pyrolysis, for example, 150° to 250° C. Under such conditions, the use of triethanolamine, or a similar polyhydroxylated reactant, may involve etherification, as well as esterification. Thus, it frequently happens that such a reaction or series of reactions, when triethanolamine or the like is used, may not be quite as simple as above indicated.

The dicarboxy acids herein contemplated as reactants or their equivalents, such as their ethyl or methyl esters, are obtained, by the polymerization, and principally, the dimerization of esters of unsaturated fatty acids, particularly conjugated diethylenic acids. Such dimerized acids or their esters are well known compositions and have been used for various processes, such as the manufacture of a resinous or synthetic coating material sold under the descriptive name of "Norelac," which, in turn, is obtained by reaction between such dimerized compounds and certain diamines. (See Oil and Soap, volume 21, No. 4, page 101.)

The chemistry of polymerization has been discussed in the literature, but for convenience, reference is made to U. S. Patent No. 2,347,562, dated April 25, 1944, to Johnson, where the following appears:

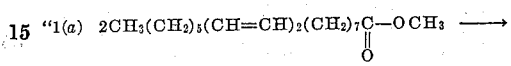

2 moles methyl ester 9,11-octadecadienic acid (originally present and/or formed by isomerization of 9,12 isomer)

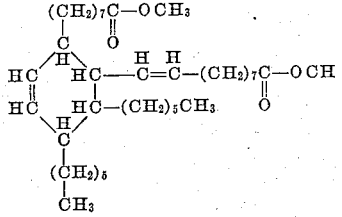

As to the preparation of such polymerized acids or esters, it is to be noted that any polyene fatty acid or its ester may be employed as a raw material. In fact, one may use a mixture such as one which occurs naturally in various drying oils. The most important of these are the octadecadienic or octadecatrienic fatty acids or their esters, but the polymeric fatty acids containing 20, 22 and 24 carbon atoms found in fish oils are also suitable.

Examples of the polyene fatty acids, the esters of which are polymerized, are the following: 9,11- and/or 9,12-octadecadienic acids (obtainable from perilla oil, linseed oil and other drying oils) both alpha- and beta- eleostearic acids (obtainable from tung oil), etc.

If esters of the polyene fatty acids be employed, such esters may be produced by direct esterification of the fatty acids with the alcohol which has been selected, but it is generally more economical and more convenient to produce the esters by mixing the alcohol with a natural drying oil, together with a trace of alkali hydroxide, hydrogen chloride, or other esterification catalyst, and thereby effect an alcoholysis or ester interchange by simply heating.

Ordinarily speaking, polymerization is conducted so as to obtain a comparatively high conversion from the monomeric state to the polymeric state, even though some polymers higher than the dimeric state may be produced, for instance, trimers or tetramers. If desired, such polymers can be separated from each other, insofar that the dimers can be separated from the higher polymers, such as the trimers or tetramers. The method employed involves selective solvent action, but does not require further description, for the reason that there is no objection to the moderate presence of higher polymers along with the dimers herein contemplated for reaction, and if polymerization is conducted under comparatively mild conditions so as to polymerize not over fifty percent of the polyene acid esters, then and in that event, the product obtained is principally the dimeric product. In any event, this is immaterial, for the reason that the dimeric products, either in the form of the ethyl or methyl ester or the acids themselves, may be purchased in the open market at the present time.

It may be well, however, to indicate briefly the general conditions of polymerization. If methyl or ethyl esters of the polyene acids be utilized, it has been found that temperatures between about 250° C. and about 350° C. are suitable for the polymerization. The time required for this polymerization varies not only with the temperature, but with the acid and the particular ester which is used. Generally, a period of from about one-half hour to about 50 hours is suitable, and in most instances, the polymerization may be effected in not over 12 hours. Dimerization can usually be accomplished in approximately one-half this period of time. If a conjugated unsaturated ester, such as the methyl ester of eleostearic acid be employed, a sufficient degree of polymerization may be obtained within one-half to one hour at about 300° C., whereas, the methyl linolenates and linoleates generally require from about 5 to 12 hours or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperatures and shorter periods of time, or shorter periods of time, than those indicated above.

In general, it is preferred to conduct the polymerization in an inert atmosphere of carbon dioxide, nitrogen or other inert gas. The polymerization is preferably continued until the refractive index, density and average molecular weight approach constant values. At this point, the polymerized esters are separated from the unpolymerized esters by any suitable method. In subsequent examples, there is suggested the separation of these esters by distilling off the unpolymerized esters at an absolute pressure of about 1–5 mm. of mercury and at temperatures up to about 300° C. Another way in which this separation may be effected, is by extraction with methanol or other suitable solvent. Generally, the result of polymerizing yields about 30% to 75% of the polymeric esters. As indicated previously, if the reaction is conducted so as to obtain mild polymerization, and less than 50% of the product in the polymeric state, it will be found that the bulk, if not all, are readily obtainable in the dimeric state.

Previous attention has been directed to the fact that the esters of any polyene higher fatty acid may be employed, or mixtures thereof. Polymerization of the kind indicated is concerned largely with conjugated polyene structure. Previous reference has been made to such acid esters as show such structure. However, the fact that any polyene ester may be employed as a raw material for the manufacture of the herein contemplated reactants, is due to the fact that such materials can be isomerized to the conjugated structure. It is well known that alkali metal hydroxides act on conjugated fatty acid and oils in either aqueous or alcoholic solutions. Procedures are available which enable the conversion of 30% to 50% of conjugated acids from soyabean and linseed oils. See Industrial and Engineering Chemistry, volume 34, page 237, and U. S. Patent No. 2,350,583, dated June 6, 1944, to Bradley. Thus, the raw materials herein contemplated include, among others, the isomerized fatty acids, or esters obtained from unsaturated higher fatty acids having at least two non-conjugated double bonds. Such materials are obtainable, for example, from linseed oil, soyabean oil, perilla oil, poppyseed oil, cottonseed oil, sunflowerseed oil, and a number of fish oils. The fatty acids, prior to isomerization, generally have an iodine number of 110, or substantially higher.

A further description of polymeric fatty acids and their compounds is found in U. S. Patent No. 2,357,839, dated September 12, 1944, to Manley & Evans. Note that in said patent such acid is referred to as a "polymeric fat acid." By analogy the dimeric acid would be referred to as "dimeric fat acid."

From a practical standpoint, two other facts are of marked interest. There is now available a solvent treated dehydrated castor oil or fatty acid derivative in which the 9,11 isomer is present to the extent of approximately 85%. This commercial product is particularly desirable as a reactant for preparation of the herein contemplated compounds. Another factor of interest is recognition of the effectiveness of certain catalysts in converting non-conjugated unsaturated fatty oils or acids so as to result in the conjugated isomer. For instance, see Oil & Soap, volume 21, No. 11, page 329.

POLYMERIZED ESTER

*Example 1*

800 parts of the methyl esters of tung oil fatty acids are heated, preferably in an atmosphere of carbon dioxide or other inert gas, to a temperature of about 275° C. in approximately 40 minutes, and the temperature is maintained at this point for about one-half an hour. The relatively volatile and unpolymerized esters are removed by distillation at about 1–5 mm. of mercury absolute pressure, the temperature being gradually raised to about 300° C., leaving a residue containing 365–380 parts of non-volatile polymerized esters.

POLYMERIZED ESTER

*Example 2*

1000 parts of the methyl esters of the fatty acids of a solvent treated dehydrated castor oil, the major proportion, for instance, 80 to 85%, of which contains the methyl ester of 9,11- and 9,12-octadecadienic acid, are polymerized at 300° C. for about 3 hours in an inert atmosphere. The volatile and unpolymerized esters are removed by distillation at 1–5 mm. of mercury absolute pressure, the temperature being gradually raised to about 300° C., leaving as a residue about 450–460 parts of non-volatile polymerized esters.

POLYMERIZED ESTER

Example 3

2000 parts of the methyl esters of the fatty acids of soyabean oil are mixed with 200 parts of activated bentonite ("Super-Filtrol") and the mixture is heated, preferably in an inert atmosphere at about 280° C. for about one-half an hour. The product is filtered and the volatile and unpolymerized esters are removed by distillation at 1–5 mm. of mercury absolute pressure, the temperature being gradually raised to about 300° C., leaving as a residue about 835–840 parts of polymerized esters.

The second class of reactants employed in the manufacture of the compounds, used for example, as demulsifiers in the demulsification of petroleum emulsions, consist of oxyalkylated surface-active heat-polymerized aminoalcohols, which, in monomeric form, are secondary or tertiary amines containing at least two alkanol or hydroxyalkyl radicals.

Briefly stated, such compounds may be obtained by the polymerization of triethanolamine, tripropanolamine, or the like, in such a manner as to eliminate water and produce ether linkages. Such polymers, consisting of tetramers or more highly polymerized forms, such as pentamers, hexamers, etc., and including decamers, or even more highly polymerized forms, are characterized by showing surface-activity. This means their dilute solutions have the ability to cause foam, to reduce the surface tension of water, to act as emulsifiers, etc. The exact composition cannot be depicted by the usual chemical formulae, for the reason that the structures may be cyclic or acyclic, or both, and subject to wide variations. The primary reaction is unquestionably etherization, although if some secondary amine, as, for example, diethanolamine, dipropanolamine, or the like, is present, it is barely possible that water is also eliminated to some degree by a reaction other than etherization, with the result that two nitrogen atoms are united by an alkylene radical, as distinguished from an alkyleneoxyalkylene radical.

Even though the exact structure of the surface-active heat-polymerized alkanolamines herein contemplated is not fully understood, it is to be noted that their method of manufacture is well known and that they are used commercially for various purposes. The hereinafter included description is typical of the conventional polymers. The alkanolamines having a single nitrogen atom, i. e., monoamines, and particularly those which represent secondary or tertiary amines, may be contemplated in their simplest aspect as oxyalkylated derivatives of ammonia. For example, even though diethanolamine and triethanolamine may be manufactured in various ways, such compounds can be manufactured by treating one mole of ammonia with two or three moles of ethylene oxide. Analogs are prepared by the use of other alkylene oxides containing a reactive ethylene oxide ring, as, for example, propylene oxide, butylene oxide, glycide or methylglycide. Such products need not be derived directly from ammonia, but may be derived from primary amines containing an aliphatic radical having 6 carbon atoms or less, as, for example, methylamine, ethylamine, propylamine, butylamine, amylamine, and hexylamine.

It is to be noted that if a product like triethanolamine is treated with an excess of an oxyethylating agent, for instance, ethylene oxide, one introduces the oxyethylene radical between the terminal hydrogen atom and the adjacent oxygen atom. Thus, ether aminoalcohols obtained by reacting triethanolamine or tripropanolamine with one or two, or even with three to nine moles of ethylene oxide, are well known. The other similar etheraminoalcohols are derived in the same manner and require no further description. For purposes of clarity, the secondary or tertiary amines herein contemplated as raw materials or reactants for polymerization, may be summarized by the following formula:

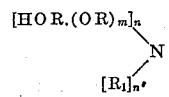

wherein OR is an alkylene oxide radical having 4 carbon atoms or less, and preferably, is the ethylene oxide radical. As indicated, OR may be the propylene oxide radical, the butylene oxide radical, the glycide radical, or the methyl glycide radical; $R_1$ is a member of the class consisting of hydrogen atoms and alkyl radicals having 6 carbon atoms or less; $m$ represents a numeral varying from 0 to 3; $n$ represents the numeral 2 or 3; and $n'$ represents the numeral 0 or 1, with the proviso that $n$ plus $n'$ equals 3.

Previous reference has been made to the fact that one may use a secondary or tertiary amine as a raw material. We prefer to use a tertiary amine, and particularly a tertiary amine containing 3 alkanol radicals; more specifically, we particularly prefer to use triethanolamine, and find that the commercially available product is suitable, in spite of the fact that it contains moderate amounts of diethanolamine, and possibly smaller amounts of monoethanolamine. It has been previously pointed out that the amino hydrogen atoms, as distinguished from the alcoholic hydrogen atom, may enter into the polymerization reaction without affecting the suitability of the final polymer. It will be pointed out subsequently that the temperatures employed for polymerization are, for instance, in the neighborhood of 250° C.

This means that in most instances, monoethanolamine or diethanolamine, if present originally, may be volatilized and lost before an opportunity presents itself for polymerization. We have found no significant difference, for example, whether a polymer has been obtained from chemically pure triethanolamine substantially free from diethanolamine and monoethanolamine, or from commercial triethanolamine having minor percentages of the primary or secondary amine present.

In the examples hereinafter included, it is noted that the polymer must represent the tetrameric stage, or a higher degree of polymerization, and must be surface-active in the conventional sense previously referred to. The products obtained in the manner herein described, when manufactured in iron vessels, represent viscous deep-amber-colored products. The degree of polymerization can be estimated approximately in the usual manner by loss of water and increase in viscosity. However, it is better to make an actual molecular weight determination in the usual manner. In any event, a determination which shows surface-activity means that the product is at least in the tetrameric state, and if the product is heated for some period of time after it has shown surface-activity with further loss of water and with further increase in viscosity, obviously the degree of polymerization, as far as the average polymer goes, must be beyond or higher than the trimeric state.

The polymerization of the basic hydroxy amines is affected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats and the like. The proportion of catalyst employed may vary from slightly less than 0.1% in some instances, to slightly over 1% in other instances. Needless to say, in the event the alcoholamine is low-boiling, customary precautions must be taken so as not to lose part of the reactants. On the other hand, conditions must be such as to permit the removal of water formed during the process. At times the process can be conducted most readily by permitting part of the volatile constituents to distil, and subsequently allowing the vapors to condense. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distil in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i. e., the effectiveness with which the water of reaction is removed from the combining mass. Polymerization can be effected without the use of catalysts in the majority of instances, but such procedure is generally undesirable, due to the fact that the reaction takes a prolonged period of time, and usually a significantly high temperature. It is noted that in the subsequent examples the final compositions of matter which are contemplated are preferably polymerized hydroxylated tertiary amines. Thus, all the subsequent description of polymerized hydroxyamines has been limited largely to the tertiary type, which is obviously the preferred type. However, it must be recognized that polymerized hydroxy amines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a more highly hydroxylated amine than from a lower one.

The use of the word "surface-active," as herein employed and as generally used, refers to a compound which is water-soluble in the sense that it at least produces a colloidal sol or solution; thus, we do not contemplate the use of products obtained by polymerization to the degree that they are no longer soluble or miscible in water, except as hereafter specified.

Incidentally, it must also be recognized that the speed of reaction and the degree of polymerization are commonly affected by the nature of the vessel in which the reaction takes place. In the examples cited, it is intended that reaction take place in a metal vessel, such as iron. However, in order to obtain the same degree of polymerization, when conducting the reaction in a glass-lined vessel, it is quite likely that the period of reaction would have to be increased 150–400%.

Suitable amines have been previously indicated, but the following may be noted in addition: Propyl propanolamine, cyclohexyldiethanolamine, cyclohexyldipropanolamine, etc.

Other well known amines which may be employed are the following:

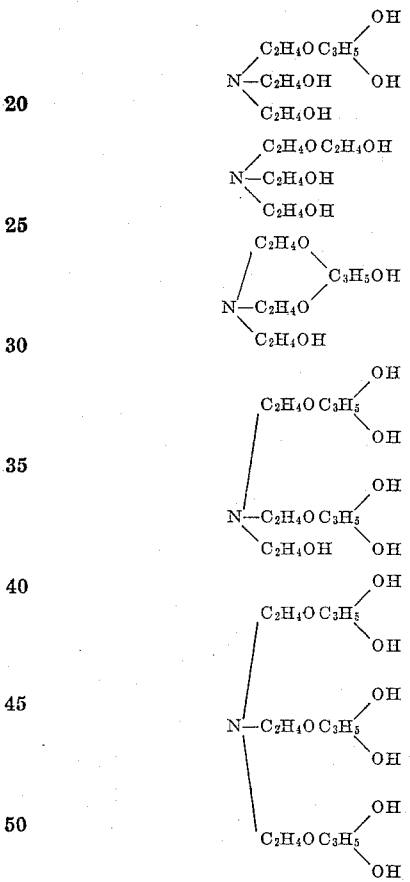

(See U. S. Patent No. 2,290,415, dated July 21, 1942, to De Groote.)

HEAT-POLYMERIZED HYDROXYAMINE

*Example 1*

1% of caustic soda is added to commercial triethanolamine and the product heated for approximately 3 hours at 245–260° C. The mass is stirred constantly, and any distillate is condensed and reserved for re-use after an intermediate re-running step for purposes of dehydration. At the end of approximately 2½ to 3½ hours, the molecular weight determination shows that the material is largely dimeric.

HEAT-POLYMERIZED HYDROXYAMINE

*Example 2*

The same procedure is employed as in the previous example, except that heating is continued for approximately another 1½ hours. In this instance, the reaction mass is largely a polymeric material, with an average molecular weight range indicating the presence of approximately four to five nitrogen atoms in the polymer.

HEAT-POLYMERIZED HYDROXYAMINE

Example 3

The same procedure is followed as in Example 2, except that a slightly higher temperature, approximately 10° higher, is employed, and a somewhat longer time of reaction, for instance ½ to 1½ hours longer than in Example 2, preceding. In any event, the reaction is continued until the product obtained either as such, or in the form of the acetate, dissolves or disperses in water in concentrations from 0.1% to 1% to give a foamy solution indicating high surface-activity.

HEAT-POLYMERIZED HYDROXYAMINE

Example 4

Tri-isopropanolamine is substituted for tri-ethanolamine in Examples 1, 2 and 3.

HEAT-POLYMERIZED HYDROXYAMINE

Example 5

Tripentanolamine is substituted for triethanolamine in Examples 1, 2 and 3.

HEAT-POLYMERIZED HYDROXYAMINE

Example 6

Polyethanolamine of the following formula:

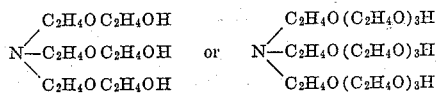

is substituted for triethanolamine in the previous examples.

The entire invention can be applied in an overwhelming majority of instances, if one has available only three types of heat-polymerized commercial triethanolamine. One type contemplates the polymerization which approximates on the average the pentameric form, i. e., the tetrameric through the hexameric form. The second type represents the next higher polymerization, which, in the bulk, approximates a heptameric state through the nonameric state. The third class represents in the bulk the decameric and somewhat higher states through and including, for example, the dodecameric state. These three grades or types or varieties of polymers of commercial triethanolamine are economical in cost, easy to prepare, and really are the outstanding reagents for employment in the present process.

It is to be noted that Example 1, preceding, is concerned with the manufacture of a dimeric form. This is included, for the reason that it is sometimes convenient to produce the dimeric or trimeric form, and then subsequently, polymerize to a degree showing a considerably increased molecular weight. Thus, at times, such interrupted operation may show some convenience in comparison with a single polymerization step.

As previously stated, the raw material subjected to oxyalkylation, and particularly oxyethylation, is a heat-polymerized, surface-active, water-soluble amine condensate, as described in detail previously. We much prefer to use heat-polymerized condensation products derived from commercial triethanolamine. Furthermore, it must be remembered that the final criterion of the degree of polymerization, especially initial state, is dependent upon an actual molecular weight determination, or an equivalent test, rather than based simply on time of reaction.

It is obvious that one cannot polymerize a material such as diethylethanolamine and have a suitable material for subsequent oxyalkylation. One may, of course, employ a heat-polymerized product obtained from an admixture of reactants in which a compound such as diethylethanolamine is one ingredient or reactant.

It is obvious that proper selection of reagents will invariably yield a final product in which amino hydrogen atoms or hydroxyl radicals are present, i. e., a material susceptible to oxyalkylation. Indeed, if there is any doubt as to the suitability of a heat-polymerized product, it can be readily subjected to treatment with ethylene oxide in a laboratory autoclave and its reactivity noted. If it is not reactive to ethylene oxide, it would not be a satisfactory reactant.

The treatment of amines, whether they be primary or secondary amines, with ethylene oxide, is well known. The effect of such reaction is to convert such primary or secondary amines into tertiary amines having an alkylol radical or its equivalent. Obviously, then a tertiary amine containing an alkylol group or its equivalent is readily susceptible to oxyalkylation. Briefly stated, such oxyalkylation of reactive amines, particularly when ethylene oxide is used as the oxyalkylating agent, can be conducted under comparatively mild conditions, such as temperatures of 125° C. to 200° C. under pressure of 80 lbs. to not over 200 pounds. In using ethylene oxide, such reaction is generally complete within three to five hours. When other oxyalkylating agents are used, which are less reactive than ethylene oxide, for instance, propylene oxide, more effective or drastic conditions of reaction may be required, such as longer period of reaction, increased temperature, increased pressure, etc.

As to suitable oxyalkylating agents, we particularly prefer to use ethylene oxide, propylene oxide, butylene oxide, glycide and methyl glycide.

OXYALKYLATED POLYMERIZED HYDROXYAMINE

Example 1

One pound mole of a material of the kind described under heading "Polymerized hydroxyamine, Example 2," is treated with three pound moles of ethylene oxide at a maximum pressure of approximately 100 pounds, and at a temperature of approximately 125° C. until reaction is complete, as indicated by substantially complete absorption of ethylene oxide.

OXYALKYLATED POLYMERIZED HYDROXYAMINE

Example 2

The same procedure is followed as in Example 1, immediately preceding, except that six pound moles of ethylene oxide are employed for each pound mole of heat-polymerized amine.

OXYALKYLATED POLYMERIZED HYDROXYAMINE

Example 3

The same procedure is followed as in Example 2, immediately preceding, except that instead of employing six pound moles of ethylene oxide for reaction with one pound mole of the polymerized amine, one employs instead nine pound moles of ethylene oxide.

OXYALKYLATED POLYMERIZED HYDROXYAMINE

Example 4

The same procedure is followed as in immediately preceding Examples 1 to 3, inclusive, except that heat-polymerized hydroxyamines exemplified by "Heat-polymerized hydroxyamine, Examples 3 to 6, inclusive," are employed instead of the material exemplified by "Heat-polymerized hydroxyamine, Example 1."

OXYALKYLATED POLYMERIZED HYDROXYAMINE

Example 5

The same procedure is followed as in Examples 1 to 4, immediately preceding, except that propylene oxide is substituted for ethylene oxide.

It will be noted that in the preceding examples no attempt has been made to remove the alkaline catalyst which may generally be present during the heat-polymerization of the hydroxyamine, which catalyst appears to accelerate oxyethylation.

The oxyalkylated and heat-polymerized triethanolamine or similar reactants have substantially the same appearance after oxyalkylation, particularly oxyethylation, as prior thereto, except that they are apt to be somewhat thinner and less resinous in character. The color is usually dark reddish or amber.

There is no need to change the dicarboxy acid esters to the acids. One may employ the methyl or ethyl esters for reaction with triethanolamine, heat polymerized triethanolamine or oxyethylated heat-polymerized triethanolamine. In such reaction a low molal alcohol, to wit, methyl or ethyl alcohol, is eliminated instead of water. This may be shown in a manner comparable to a previous reaction in the following way:

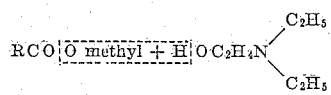

saponification of the ethyl and methyl ester, followed by acidification, yields the free acids. In some of the subsequent reactions one need not necessarily unite both carboxyl radicals with the amine radical. In other words, the reaction can be conducted between the dicarboxy compound and the polyhydroxylated amine so as to eliminate only one mole of water, or one mole of methyl alcohol or ethyl alcohol. We have found that the type of compound wherein any carboxyl radical not esterified with an aminoalcohol group or its equivalent, is in a free form, or unreacted form, yields a better demulsifier than the corresponding ester form. The reason probably resides in the fact that the carboxyl may unite electrovalently with an amine which is part of the same molecule, thus forming an inner salt or a compound comparable thereto, or possibly with an amine residue which is part of another molecule, and thus, promote association. The corresponding ester radical would not participate in such modification.

AMINOESTER

Example 1

Four separate batches of heat-polymerized triethanolamine corresponding, roughly, to a tetramer and manufactured in a manner previously described under the heading "Heat-polymerized hydroxyamine, Example 2," are treated with approximately 3, 6, 10 and 15 molecular proportions of ethylene oxide. Assuming the molecular weight of the tetramer to be 675, one can conveniently treat four batches of the tetramer equal to 675 pounds each with 150, 300, 400 and 675 pounds of ethylene oxide. The result represents 825, 975, 1125 and 1350 pounds of the oxyethylated derivative.

1 pound mole of a dimerized soybean fatty acid corresponding to the following formula:

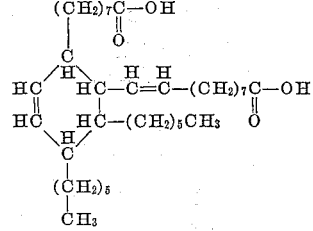

and having a molecular weight of 560, is reacted in the conventional manner with 1 pound mole (825 lbs.) of the 1:3 oxyethylated derivative previously described. The reaction is conducted at approximately 175° to 225° for approximately 1½ to 2 hours, until 1 pound mole of water is eliminated. The reaction is conducted with constant stirring and with elimination of the water of formation. The procedure is substantially the same as the esterification of triethanolamine with stearic acid. The final product is a viscous amber product showing colloidal solubility in water and better solubility in presence of dilute acid.

We prefer to conduct the esterification reaction at a temperature which is distinctly lower than the temperature reaction employed in polymerization of the triethanolamine or similar hydroxyamine. The purpose of such procedure is to promote esterification, rather than any additional etherization. Such procedure has the added advantage that by collecting the water of esterification, one can estimate or measure the extent of esterification. If, however, etherization takes place at the same time, there is the disadvantage that the water collected does not necessarily represent water of esterification alone, but to some extent, represents water of etherization.

AMINOESTER

Example 2

The same procedure is employed as in the preceding example, except that the time of heating is increased to approximately 2 to 2½ hours, so as to eliminate 1½ pound moles of water.

AMINOESTER

Example 3

The same procedure is employed as in the preceding examples, except that the time of heating is increased to approximately 2½ to 3 hours, so as to eliminate 2 pound moles of water.

AMINOESTER

Example 4

The same procedure is employed as in the preceding examples, except that the time of heating is increased to approximately 4 hours, so as to eliminate more than 2 pound moles of water, i. e., to insure some additional etherization as well as esterification.

AMINOESTER

Example 5

The same procedure is employed as in Examples 1 to 4, preceding, except that the 1:6, 1:10 and 1:15 ratio oxyethylated derivative is employed instead of the 1:3 ratio oxyethylated derivative. This means that 975 pounds of the 1:6 ratio compound, 1125 pounds of the 1:10 ratio compound, and 1350 pounds of 1:15 ratio replaces 825 pounds of the 1:3 ratio employed in the first experiment.

AMINOESTER
Example 6

The same procedure is followed as in Examples 1 to 5, inclusive, except that an oxyethylated heptamer or equivalent is employed. Such product may be obtained by the oxyethylation of a product such as that described under the heading "Heat-polymerized hydroxyamine, Example 3." If one employs 945 as an average molecular weight value, and then the same amounts of ethylene oxide are added as in the previous example, 150 pounds, 300 pounds, 450 pounds, and 657 pounds, the molecular weights of the oxyethylated products then approximate 1100, 1250, 1400 and 1625. In all other respects, the products are obtained in the same manner as in Example 5.

AMINOESTER
Example 7

The same procedure is followed as in Example 5, preceding, except that one employs an oxyethylated decamer or the approximate equivalent thereof. Using a value of 1325 for the molecular weight of the decamer, it means the same datio employed in Example 5, preceding, i. e., 1:3, 1:6, 1:10 and 1:15, giving oxyethylated derivatives in which the molecular weights correspond to 1475, 1625, 1775 and 2000. In all other respects, the products are obtained in the same manner as in Example 5.

AMINOESTER
Example 8

The dimerized acids obtained from tung oil fatty acids are employed instead of the corresponding derivative derived from soyabean oil fatty acids. Compare "Polymerized ester, Example 1," preceding, with "Polymerized ester, Example 3, preceding.

The amines contemplated for reaction with the dicarboxy acids are polyamines having basic amino radicals. Thus, they can form hydrates by contact with water or salts by combination with organic or inorganic acids, thus forming the acetate, hydroxyacetate, lactate, gluconate, propionate, caprate, phthalate, fumarate, maleate, benzoate, succinate, oxalate, tartrate, chloride, nitrate, or sulfate. The aminoester, without contact with water or acid, may of course, be dissolved in an anhydrous solvent.

We desire to point out that we are aware of the fact that there are other reactants, which, at first glance, appear to bear a superficial relationship to the reactants herein contemplated. One might assume that such reactants could be employed to produce products comparable to those herein described. We have found the contrary to be true. For instance, we are aware that there are a variety of other high molal dicarboxy acids, such as sebacic acid, analogues of the same, etc. Other classes include dimers of abietic acid, etc. Acetalized ricinoleic acid is an additional example. Diels-Alder and Clocker adducts represent another type, particularly when derived from maleic anhydride, etc. We have not found such particular products could be substituted for the reactants herein described, and particularly, the dimeric acids indicated in detail. Similarly, other amines bearing a superficial resemblance to the polymeric products herein described are known. One class is obtained by the polymerization of oxyethylated polyalkylene amines, particularly those having four to five amino nitrogen atoms. We have not found such products to serve as satisfactory reactants.

The new materials or compositions of matter herein described are useful as wetting, detergent and leveling agents in the laundry, textile, and dyeing industries; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive, as far as industrial application goes, although the most important use of our new material is as a demulsifier for water-in-oil emulsions, and more specifically, emulsions of water or brine in crude petroleum.

We have found that the chemical compounds herein described, which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote & Keiser. As to using compounds of the kind herein described as demulsifiers, or in particular as surface tension depressants, in combination with mineral acid for acidization of oil-bearing strata, reference is made to U. S. Patent No. 2,236,383, dated February 25, 1941, to De Groote & Keiser.

The new compounds herein described are of utility, not only for the purposes specifically enumerated in detail, but they also find application in various other industries, processes, and for various uses where wetting agents of the conventional type are used. As to some of such additional uses which are well known, see "The expanding application of wetting agents," Chemical Industries, volume 48, page 324 (1941).

Another use for the compounds herein contemplated is in the prevention of landslides, as described in U. S. Patent No. 2,348,458, dated May 9, 1944, to Endersby.

It may be well to note that polymerization of polyene acids is not limited to the esters, but that the acids per se may be polymerized. This fact is noted, for example, in the aforementioned Johnson U. S. Patent No. 2,347,562.

Insofar that the acid employed is dibasic, and since the oxyalkylated heat-polymerized condensate is very apt to be polyhydroxylated, it is obvious that resinification takes place to a greater or lesser degree, and particularly in such instance where etherification is caused to take place along with esterification. This fact, added to what has been pointed out previously, emphasizes the difficulty of attempting to depict the final product by any approximation of a structural formula.

Having thus described our invention, what we claim as new and desire to secure by Letters Patent is:

1. A basic aminoalcohol mono-ester, in which the aminoalcohol radical is that of an oxyalkylated heat-polymerized aminoalcohol, which heat-polymerized aminoalcohol is surface-active and additionally is the resultant of the heat polymerization in the presence of an alkaline catalyst to at least the tetrameric state of the nonsurface-active monomer

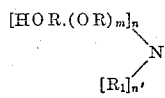

wherein OR is an alkylene oxide radical having 4 carbon atoms or less; $R_1$ is a member of the class consisting of hydrogen atoms and alkyl radicals having 6 carbon atoms or less; $m$ represents a numeral varying from 0 to 3; $n$ represents a numeral varying from 2 to 3; and $n'$ represents a numeral varying from 0 to 1, with the proviso that $n$ plus $n'$ equals 3; the radical introduced by oxyalkylation being a repetitious oxyalkylene radical, in which the units have 4 carbon atoms or less; the number of said units introduced per aminoalcohol polymer being not in excess of the molal ratio of 15 to 1; and the acidic radical of said aminoalcohol ester being the dimer obtained by polymerization at elevated temperature of a substance selected from the group consisting of polyene higher fatty acids and their methyl and ethyl alcohol esters.

2. An aminoalcohol ester, as described in claim 1, wherein $n'$ is zero.

3. An aminoalcohol ester, as described in claim 1, wherein $n'$ is zero, and $m$ is zero.

4. An aminoalcohol ester, as described in claim 1, wherein $n'$ is zero, $m$ is zero, and OR is the ethylene oxide radical.

5. An aminoalcohol ester, as described in claim 1, wherein $n'$ is zero, $m$ is zero, OR and every alkylene oxide radical is the ethylene oxide radical, and the monomeric polyene fatty acid radical has 18 carbon atoms.

6. An aminoalcohol ester, as described in claim 1, wherein $n'$ is zero, $m$ is zero, OR and every alkylene oxide radical is the ethylene oxide radical, the monomeric polyene fatty acid radical has 18 carbon atoms, and the heat-polymerized aminoalcohol prior to oxyethylation representing the range of the tetrameric state through the hexameric state.

7. An aminoalcohol ester, as described in claim 1, wherein $n'$ is zero, $m$ is zero, OR and every alkylene oxide radical in the ethylene oxide radical, the monomeric polyene fatty acid radical has 18 carbon atoms, and the heat-polymerized aminoalcohol prior to oxyethylation representing the range of the heptameric state through the nonameric state.

8. An aminoalcohol ester, as described in claim 1, wherein $n'$ is zero, $m$ is zero, OR and every alkylene radical is the ethylene oxide radical, the monomeric polyene fatty acid radical has 18 carbon atoms, and the heat-polymerized aminoalcohol prior to oxyethylation representing the range of the decameric state through the dodecameric state.

MELVIN DE GROOTE.
BERNHARD KEISER.

REFERENCES CITED

The following references are of record in the file of this patent:

UNITED STATES PATENTS

| Number | Name | Date |
|---|---|---|
| 2,379,413 | Bradley | July 3, 1945 |
| 2,389,763 | Cahn | Nov. 27, 1945 |
| 2,395,400 | De Groote | Feb. 26, 1946 |